US012719667B2

(12) United States Patent
Cambou

(10) Patent No.: US 12,719,667 B2
(45) Date of Patent: Aug. 25, 2026

(54) DETECTING EAVESDROPPING IN LONG DISTANCE QUANTUM KEY DISTRIBUTION

(71) Applicant: The Arizona Board of Regents on behalf of Northern Arizona University, Flagstaff, AZ (US)

(72) Inventor: Bertrand F. Cambou, Flagstaff, AZ (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 59 days.

(21) Appl. No.: 18/972,468

(22) Filed: Dec. 6, 2024

(65) Prior Publication Data

US 2025/0192997 A1 Jun. 12, 2025

Related U.S. Application Data

(60) Provisional application No. 63/607,356, filed on Dec. 7, 2023.

(51) Int. Cl.
*H04L 9/08* (2006.01)

(52) U.S. Cl.
CPC .................................. *H04L 9/0858* (2013.01)

(58) Field of Classification Search
CPC ..................................................... H04L 9/0858
USPC .......................................................... 380/278
See application file for complete search history.

(56) References Cited

U.S. PATENT DOCUMENTS

| | | | | |
|---|---|---|---|---|
| 10,103,881 B2 | 10/2018 | Choi | | |
| 11,265,151 B2 | 3/2022 | Cambou et al. | | |
| 11,283,633 B2 | 3/2022 | Cambou | | |
| 11,625,478 B2 * | 4/2023 | Cambou | H04L 9/3278 | 726/6 |
| 11,736,305 B2 * | 8/2023 | Cambou | H04L 9/3278 | 713/168 |

(Continued)

FOREIGN PATENT DOCUMENTS

| | | |
|---|---|---|
| CN | 109450628 | 3/2019 |
| CN | 110574333 | 12/2019 |
| WO | 2005076520 | 8/2005 |

OTHER PUBLICATIONS

Nguyen, K. C. et al., Side-Information Coding With Turbo Codes and Its Application to Quantum Key Distribution, arXiv preprint cs/0406001, 2004.

(Continued)

*Primary Examiner* — Teshome Hailu
(74) *Attorney, Agent, or Firm* — Quarles & Brady LLP

(57) ABSTRACT

Methods and systems for performing secure quantum key distribution (QKD) while detecting photon interception and eavesdropping. A first computing device generates a challenge set using a secret seed, applies the challenges to its CRP, and receives an ordered set n responses. Those responses are sent under a QKD protocol. The second computing device generates the same challenges and recovers the same responses with a mirror CRP mechanism. The second device identifies generated responses that match received responses. Bit errors in these matching response pairs provide a measured of BER on the channel. BER that is significantly above a nominal BER indicates eavesdropping.

19 Claims, 10 Drawing Sheets

(56) References Cited

U.S. PATENT DOCUMENTS

| | | | | |
|---|---|---|---|---|
| 11,750,390 | B2 * | 9/2023 | Mathieu | G06F 21/30<br>713/186 |
| 11,784,795 | B2 * | 10/2023 | Ragan | H04L 63/0435<br>713/153 |
| 11,936,782 | B2 | 3/2024 | Cambou et al. | |
| 2009/0169015 | A1 | 7/2009 | Watanabe | |
| 2021/0152347 | A1 * | 5/2021 | Cambou | H04L 9/0858 |
| 2023/0096860 | A1 * | 3/2023 | Cambou | H04L 9/0863<br>713/189 |
| 2023/0318820 | A1 * | 10/2023 | Fooksman | G06F 21/46<br>713/184 |
| 2024/0048372 | A1 | 2/2024 | Cambou et al. | |
| 2024/0348436 | A1 | 10/2024 | Cambou et al. | |

OTHER PUBLICATIONS

Rosenberg, D. et al., Practical Long-Distance QKD System Using Decoy Levels, New Journal of Physics, vol. 11, Apr. 2009.

Ma, X. et al., Phase-Matching Quantum Key Distribution, Phys. Rev. X 8, 031043, Aug. 2018.

Milicevic, M. et al., Quasi-Cyclic Multi-Edge LDPC Codes for Long-Distance Quantum Cryptography, NPJ Quantum Information, 4: 21, 2018.

Wang, S. et al., Beating the Fundamental Rate-Distance Limit in a Proof-of-Principle QKD System, Phys. Rev. X 9, 021046, 2019.

Majstorovic, J. et al., Erratum: Earth's Spheroidal Motion Induced by a Gravitational Wave in Flat Spacetime, Erratum Phys. Rev. X 9, 029901 (2019).

Li, W. et al., Phase Matching QKD Based on Single-Photon Entanglement, Sci Rep 9, 15466, 2019, https://doi.org/10.1038/s41598-019-51848-9.

Benletaief, N. et al., Efficient Quantum Key Distribution Reconciliation. arXiv preprint arXiv:2002.04887 2020.

Gümüş, K. et al., A Novel Error Correction Protocol for Continuous Variable Quantum Key Distribution, Sci Rep 11, 10465, 2021, https://doi.org/10.1038/s41598-021-90055-3.

Zhou, MG. et al., Neural Network-Based Prediction of The Secret-Key Rate of Quantum Key Distribution, Sci Rep 12, 8879, 2022, https://doi.org/10.1038/s41598-022-12647-x.

Cao, Y. et al., The Evolution of Quantum Key Distribution Networks: On the Road to the Qinternet, In IEEE Communications Surveys & Tutorials, vol. 24, No. 2, pp. 839-894, 2022, doi: 10.1109/COMST.2022.3144219.

Wang, J. et al., An Overview on Deployment Strategies for Global Quantum Key Distribution Networks, Wireless Communications and Mobile Computing, Article ID 9927255, 2022, https://doi.org/10.1155/2022/9927255.

Huth, C. et al., Information Reconciliation Schemes in Physical-Layer Security: A Survey, Computer Networks (2016), doi: 10.1016/j.comnet.2016.06.014.

* cited by examiner

FIG. 6

QC is transmitting photons with two wavelengths (1350nm and 1550nm).

- With base + at $0^0$ and $90^0$
  - at 1350nm: "0": |0> ; "1": |1>
  - at 1550nm: "2": |0> ; "3": |1>
- With base X at $45^0$ and $135^0$
  - at 1350nm: "0": |+> ; "1": |->
  - at 1550nm: "2": |+> ; "3": |->

| ↓ $z_i$ | Photon Transmitted | |
|---|---|---|
| | Base + | Base X |
| 0 | — | / |
| 1 | \| | \ |
| 2 | — | / |
| 3 | \| | \ |

FIG. 7

QC is transmitting photons with quantum errors (one flip)

- With base + at $0^0$ and $90^0$
  - at 1350nm: "0": |1> ; "1": |0>
  - at 1550nm: "2": |1> ; "3": |0>
- With base X at $45^0$ and $135^0$
  - at 1350nm: "0": |-> ; "1": |+>
  - at 1550nm: "2": |-> ; "3": |+>

| ↓ $z_i$ | $z_i$ *: Reception with one flip | |
|---|---|---|
| | Base + | Base X |
| 0 | 1 | 1 |
| 1 | 0 | 0 |
| 2 | 3 | 3 |
| 3 | 2 | 2 |

FIG. 8

The value of the received from quatrit $z_i$ is affected by the error $\beta_i$ (one flip)

- With base + at $0^0$ and $90^0$
    - at 1350nm: "0":$\beta_i$=1 ; "1":$\beta_i$=-1
    - at 1550nm: "2":$\beta_i$=1 ; "3":$\beta_i$=-1
- With base X at $45^0$ and $135^0$
    - at 1350nm: "0":$\beta_i$=1 ; "1":$\beta_i$=-1
    - at 1550nm: "2":$\beta_i$=1 ; "3":$\beta_i$=-1

| ↓ $z_i$ | $\beta_i$: Reception with one flip | |
|---|---|---|
| | Base + | Base X |
| 0 | 1 | 1 |
| 1 | −1 | −1 |
| 2 | 1 | 1 |
| 3 | −1 | −1 |

FIG. 9

| $\downarrow x_i$ | Erratic $x_i *= x_i + \beta_i$ received (one flip) | | | |
|---|---|---|---|---|
| | $y_i = 0$ | $y_i = 1$ | $y_i = 2$ | $y_i = 3$ |
| **0** | $z_i = 0$ $\beta_i = 1$ $x_i *= 1$ | $z_i = 1$ $\beta_i = -1$ $x_i *= 3$ | $z_i = 2$ $\beta_i = 1$ $x_i *= 1$ | $z_i = 3$ $\beta_i = -1$ $x_i *= 3$ |
| **1** | $z_i = 1$ $\beta_i = -1$ $x_i *= 0$ | $z_i = 2$ $\beta_i = 1$ $x_i *= 2$ | $z_i = 3$ $\beta_i = -1$ $x_i *= 0$ | $z_i = 0$ $\beta_i = 1$ $x_i *= 2$ |
| **2** | $z_i = 2$ $\beta_i = 1$ $x_i *= 3$ | $z_i = 3$ $\beta_i = -1$ $x_i *= 1$ | $z_i = 0$ $\beta_i = 1$ $x_i *= 3$ | $z_i = 1$ $\beta_i = -1$ $x_i *= 1$ |

| $\downarrow x_i$ | Probability to have $x_i *$ with BER=$\alpha$ | | | |
|---|---|---|---|---|
| | $x_i *= 0$ | $x_i *= 1$ | $x_i *= 2$ | $x_i *= 3$ |
| **0** | $1-\alpha$ | $\alpha/2$ | 0 | $\alpha/2$ |
| **1** | $\alpha/2$ | $1-\alpha$ | $\alpha/2$ | 0 |
| **2** | 0 | $\alpha/2$ | $1-\alpha$ | $\alpha/2$ |
| Average | $(1-\alpha/2)/3$ | 1/3 | $(1-\alpha/2)/3$ | $\alpha/3$ |

FIG. 10

DETECTING EAVESDROPPING IN LONG DISTANCE QUANTUM KEY DISTRIBUTION

CROSS-REFERENCE TO RELATED APPLICATIONS

The present application claims priority to U.S. Provisional Application 63/607,356 entitled "DIFFERENTIATING EAVESDROPPING AND QUANTUM ERRORS", filed on Dec. 7, 2023, the entirety of which is incorporated herein by reference.

STATEMENT REGARDING FEDERALLY-SPONSORED RESEARCH

NA

BACKGROUND

Information is frequently encrypted to protect against eavesdropping and unauthorized access using encryption schemes based on the use of one or more encryption keys and other keyless encryption schemes. The use of encryption schemes generally requires two communicating parties ("Alice" and "Bob") to share or independently generate matching keys which are used to encrypt communication. Quantum Key Distribution (QKD) provides several methods for key exchange which are advantageous, primarily because they are highly resistant to undetectable eavesdropping. QKD involves encoding information in quantum states of particles. When photons are used, for example, information is encoded in the polarization states of individual photons which are transmitted over quantum channels (i.e., ideally low loss channels that do not alter the polarization state of the photos during transit). A persistent problem with QKD is noisy channels, which might result in the loss of photons.

Performing QKD over long distances is often required, however, the quantum error rates expand exponentially with linear increases in the distances over which photos are transmitted. Such a problem is conventionally addressed by adding redundant information and data helpers with error correction codes. The redundant information needed to correct the quantum errors also increases exponentially with the transmitted distances, thereby quickly reducing the bandwidth of the quantum channel.

In quantum key distribution (QKD) schemes, random sequences of logical bits, "0"s or "1"s, are converted into polarized photons, the quantum bits (qubits), which are transmitted through quantum channels such as low-loss optical fibers or ground to satellite schemes. With the early version of QKD, BB84, the transmitting party ("Alice") randomly selects a configuration between two possible bases, "+" and "X", for each transmitted qubit. The receiving party ("Bob") also random selects a configuration between two possible bases "X", and "+". With the base "+", the photons are either oriented at 0° (↔) for a logical "0", or at 90° (↕) for a logical "1". With the base is "X", the orientation is at 45° (↗) for a "0", or at 135° (↖) for a "1".

After transmission, both communicating parties share the respective positions of their bases over the course of the transmission. This may be done over a public or open channel, but the identify of Bob and Alice should be authenticated. The parties then sort out the portion of the stream transmitted and received with the same base, either "X" with "X" or "+" with "+", while the portion of the stream transmitted with mismatching basis is ignored. The key may be the bitstream that corresponds to the positions for which Bob and Alice had matching bases. The transmission with matching basis should contain only a very small number or errors, unless an eavesdropping party disturbs the data, or when the rate of quantum errors is too high.

In the last 30 years, various QKD schemes have been proposed to replace or improve the BB84 scheme, however, the ability to transmit photos through quantum channels with low error rates remains a limiting factor to cover long distances. Thus, the effect of quantum errors and noisy channels remains a significant problem that has not been overcome by the introduction of different QKD schemes.

Many efforts have been suggested to increase the allowable transmission distance for quantum key exchange. Many of these methods rely on the use of helper data or error correcting codes such as low-density parity checking codes (LDPC) or multiple decoding attempt protocol (MDA) during the key reconciliation process. Both LDPC and MDA add information to the QKD data stream. This is disadvantageous because added data may help eavesdroppers reconstruct the steam. Error correction codes are also widely used in conventional key reconciliation, which is the process by which Alice and Bod recover identical keys from the same data transmission. Four common methods of QKD key reconciliation are (1) the Cascade Protocol, (2) the Yamaura and Ishizuka's Protocol, (3) Low Density Parity Check Code, and (4) the Winnow Protocol. All of these methods require the use of ECCs, and so suffer from the inherent disadvantages of ECCs.

Hardware solutions to noisy quantum channels have also been proposed. The distance limitation can be overcome by using trusted or untrusted relay nodes to read and transmit data between communicating parties, but these nodes introduce security issues and extra costs. A trusted relay node linking Alice =and Bob may be breached if any of the nodes are compromised. Untrusted relay node networks are assumed to be secure even if the eavesdropper controls a node, however, untrusted relay node protocols are still being developed and are far from commercial implementation. Another disadvantage of relay nodes is that each node requires equipment to read and re-transmit quantum information, increasing the cost of implementation significantly.

To help refresh transmitted data, quantum repeaters (passive optical devices that retransmit or amplify quantum signals without disturbing the quantum state) have been theorized to restore the quantum information without measurement. However, feasible quantum repeaters have yet to be implemented.

Moreover, even when developed, the integration of quantum repeater units into the quantum transmission channel would require additional equipment, coupled with the adoption of bell state analysis techniques. These augmentations will inevitably entail additional costs per quantum repeater deployed. Furthermore, the incorporation of each repeater would introduce potential vulnerabilities, serving as potential points of attack that warrant the same scrutiny as potential adversaries (referred to as Eves). Prior methodologies also heavily lean on the utilization of shared auxiliary data, which is subsequently employed by error correction mechanisms generally situated within a post-processing milieu. These post-processing methodologies encompass iterative deployment of parity check matrices, the integration of quantum memory to retain quantum states for the determination of an optimal count of photons for subtraction, directly linked to transmission errors/noise, or the execution of permutation techniques for the reconciliation of bit errors. Many methods utilize LDPC, Winnow, and CAS- CADE during the reconciliation phase to address error correction. Other works employ Turbo codes for both discrete variable and continuous variable QKD systems. Further variations of error reconciliation methods exist; for example, the inventors of quantum key distribution method, communication system, and communication device have presented a method of error probability estimation and error correction that increases key generation efficiency. However, this method also utilizes public channel communication and compares predetermined positions in the transmitted and received data, which differs from our method entirely.

Thus, numerous methodologies have been suggested in the domain of quantum key distribution communication for the purpose of key reconciliation. These methods involve the utilization of supplementary real time or post processing auxiliary data, which is shared to mitigate the impact of transmission noise and losses within the quantum channel. The spectrum of key reconciliation encompasses systems incorporating repeater units, immediate processing of auxiliary data such as parity check matrices, as well as post-reception processing procedures. As set forth above, all of these conventional solutions suffer from disadvantages, and improvement is warranted.

BRIEF SUMMARY

The objective of the present disclosure is to enable key reconciliation without the requirement for helper data, error correction codes, or the hardware solutions described above. The solution described in this disclosure leverages shared challenge-response-pair CRP mechanisms accessible to both communicating parties (Alice and Bob, as used herein). The methods described below describe these CRP mechanisms as "cryptographic table(s)", but the methods described herein are applicable to any CRP mechanism that repeatably produces a unique and unpredictable output from a given input. These may be literal cryptographic tables (e.g., a data structure in the nature of an addressable one-time pad), one-way functions such as hash functions, combinations of one-way functions, etc. One preferred CRP mechanism is a physical unclonable function (PUF), or even more preferred, an array of addressable physical unclonable functions. The use of PUF arrays as CRP mechanisms for cryptographic key exchange is described in co-owned U.S. Pat. No. 11,265,151, published on Sep. 12, 2019, and entitled "KEY EXCHANGE SCHEMES WITH ADDRESSABLE ELEMENTS", and U.S. Pat. No. 11,283,633, published on Sep. 17, 2020, and entitled "PUF-BASED KEY GENERATION FOR CRYPTOGRAPHIC SCHEMES." The foregoing patents are incorporated herein by reference in their entireties for all purposes. These references describe how a party with a PUF array may provide challenges to the array, where the challenges may be addresses of physical elements and measurement conditions, and receive responses, which are measurements of physical properties of the devices measured under the specified conditions. The PUF may be characterized, ideally in a secure environment, to build an "image" of the PUF, which is a cryptographic table that records all possible challenges available under a method (e.g., the addresses of elements being measured and conditions), and the resulting responses measured from the PUF. This table or image may then be stored by one communicating party (i.e., a server), which is in a secure and trusted environment. A party in an unsecured or untrusted environment (i.e., a client) may possess the PUF itself, along with electronics required to measure the PUF (i.e., generate challenges to responses).

This arrangement may be used to securely exchange cryptographic keys in the following manner. One party (client or server) generates a seed, which is shared with the other party over an unsecure channel. Alternatively, the parties can independently generate the same seed (e.g., with synchronized clocks). A shared seed may be thought of as a public key because it may be shared on an unsecure channel. Each party then uses the seed to generate a set of challenges. The challenges are applied to generate responses (i.e., the server looks up responses in the PUF array image corresponding to the challenges and the client uses the same challenges to measure responses from the PUF). The responses, which each party has independently generated on the basis of unique information known only to that party (e.g., the PUF array and its image) may then be used as the basis for independent generation of encryption keys. This simple example is in no way limiting in the following disclosure, and there are innumerable permutations to this basic idea that may be incorporated to deal with, for example, non-deterministic PUF responses, which may not match the initially measured responses in the image or cryptographic table.

Some of these concepts may be combined with QKD protocols to render QKD more resistant to errors introduced by noisy transmission channels. Inventive embodiments described herein allow the transmission of error free cryptographic keys through quantum channels at longer distances because they can handle much higher quantum error rates than conventional methods. In certain embodiments, subsets of responses (i.e., CRP mechanism responses) are transmitted through quantum channels with a QKD protocol such as, but not limited to, BB84, Decoy, EPR transmission, and multi-wavelength QKD. Error free cryptographic keys are retrieved by the receiving party from the transmitted subset of responses through CRP mechanisms even when the quantum error rates in the subset of responses are as high as 30 to 45%. These methods are not limited to QKD or quantum information channels but can also be applied to classical information channels as well where the objective is the secure transmission of symmetrical encryption keys.

Inventive methods rely on both parties having access to the same index cryptographic table. The indices of the table to be used are transmitted publicly between Alice and Bob, while Alice (the sender) manipulates the responses related to the indices using a secret key. Bob (the receiver) uses his independent knowledge of the responses to reconstruct the secret key even with Alice's signal sent through a noisy quantum channel because the secret key is encoded by the selection of a subset of responses transmitted between Alice and Bob. These responses are known only to Alice and Bob.

The approaches described herein differ from conventional approaches by avoiding the transmission of auxiliary data and error correction solutions for key reconciliation. This is accomplished through the implementation of a pair of CRP mechanisms, for example, a physical unclonable function or a cryptographic table. In the case of a PUF, the PUF assumes tangible form within the framework of the sending or receiving entities, supplemented by an enrolled representation of the PUF (i.e., an image or data characterizing PUF responses as a function of challenges). The image may be preserved or exchanged within the systems of the other pertinent parties, ideally in a secure environment. In the context of data transmission from Alice to Bob across public channels, Alice imparts challenge message to Bob. This challenge message is instrumental in regenerating a secret key, drawing from data extracted from the PUF.

In one aspect, the invention includes a method of performing QKD between a first computing device and a second computing device. The first computing device generates a set of challenges and applies them to a CRP (which may be a PUF or its image) and receives a set of n responses, each of bit length P. The first device also generates a random key of length n. The first device selects m responses that correspond to the positions of 1s in the key and sends those to a second computing device over the quantum channel. Where the QKD protocol being used in BB84, the first computing device also sends a random number Ra, which it generated to select polarization bases used select the polarization states of the photon stream onto which the transmitted responses were encoded.

On the receiving end, the second computing device generates the same challenges. It may receive a message digest or random seed or index from the first computing device to help generate the same challenges. The challenges are applied to a mirrored CRP (such as a PUF that corresponds to the first computing device's image, or vice versa) to generate the same n responses that the first computing device originally generated. The second computing also generates a random number Rb, which is used to select the polarization bases that it uses to select the polarization states of filters sequentially applied to received qubits. The second computing device also receives Ra and uses Ra and Rb to build a filter to blank bit at positions where Ra does not match Rb (i.e., where the first device sent qubits with polarization basis that did not match the selected basis of the second device). This filter is applied in receipt of the qubits and results in the received responses being sub-selected and having a length of approximately p/2 or pi. The same Ra/Rb filter is then applied to the generated responses. The received responses are then compared to the filtered generated responses, and for positions where there is a match, a 1 is assigned in the key. 0s are assigned to all other positions.

In this manner, a key may be independently generated by both devices, by sharing what is effectively an index showing the positions of one of the binary symbols in the key. Because the index information is encoded with a multi-bit number (a response of bit length P), the entirety of each response need not be received. This means that the inventive methods are remarkably insensitive to noise, and do not require the use of auxiliary helper data to reconcile keys from data transmitted over noisy channels. Moreover, with the inventive systems, there is no need to integrate quantum repeater units into quantum transmission channels, which saves on cost and eliminates another point of attack.

The systems and methods thus described may be further extended to provide other advantages. As is set forth throughout this disclosure, transmitting the response stream through a quantum channel is not an essential component of the method. Where quantum channels are used, any encoding scheme may be used. That is to say BB84 is not an essential component of the method. Additionally, multi-wavelength QKD methods that transmit more than two symbols may be used in connection with the methods described herein.

In one extension of the method described above, bit error rates (BERs) in the received responses may be measured, and from such measurements, a determination may be made as to whether the errors are being introduced by quantum noise, or by eavesdropping. When QKD bits are being intercepted by an eavesdropper on the transmission channel, the eavesdropping may be expected to introduce a BER of 25%. Thus, when the BER on a channel exceeds 25%, there may be uncertainty as to whether the errors are being introduced by an eavesdropper, or whether the channel is just particularly noisy. In most cases, however, the quantum noise generated during transmission through the quantum channel is known, or can be measured. The detailed description that follows describes how this knowledge may be used to detect eavesdropping.

In one embodiment, a quaternary quantum encoding scheme using two wavelengths is used to encode and transmit/receive responses and other data. One example of such a scheme is disclosed in co-assigned U.S. patent application Ser. No. 16/951,760, entitled "Secure multi-state quantum key distribution with wavelength division multiplexing", filed on Nov. 18, 2020, published on May 20, 2021, which is incorporated by reference herein in its entirety for all purposes. The transmission protocols disclosed in that application are usable in connection with the improved methods to be described herein.

In the methods described above, received responses (after having been filtered by the QKD filters) are compared with similarly filtered, locally-generated responses, and matches are determined when the responses match to within some threshold. This comparison and matching process enables devices implementing the method to measure or at least estimate BER, i.e., by measuring the rate of errors in responses that match local responses above some threshold. Equivalently, the BER of the channel may be estimated by looking at the rate of wrong bits in responses for which there is a high degree of confidence that there is a matching locally response. While some of these errors may be due to the CRP mechanism (e.g., the device with the PUF may generate responses that are slightly different from previously measured responses that are stored in the image on the other device), this error rate can be minimized by blanking unstable PUF devices, as will be discussed below. The residual errors introduced by inconsistent and indeterminate PUF devices, after blanking the known bad devices, can also be characterized during a secure enrollment phase, and subtracted out of an estimate of the BER of the channel. The final estimation of BER may be used to detect eavesdropping while sharing ephemeral keys under a QKD protocol such as BB84 as follows:

As described above, the recovery of an N-bit long ephemeral key is based on the processing of a subset of approximately N/2 P-bit long responses. Without any error, i.e., with a BER of 0, each response of the subset of matched with a response that has the same information for the positions with matching QKD bases through a QKD protocol (e.g., BB84). The rate of bad bits (i.e., bad bits over time) for matching responses is a measurement of BER. This measurement is compared with $\alpha$, which is the nominal BER of the quantum channel. This parameter can be measured beforehand by exchanging known strings of information and measuring BER or by predicting and computing an expected BER given the physical properties of the data transmission channel, medium and transmission parameters. If the difference between the contemporaneously measured BER and a exceeds three times the standard deviation of $\alpha$ (i.e., 36), eavesdropping has been detected. When eavesdropping is detected, systems implementing inventive methods can take any number of corrective actions such as discontinuing communication, sending warning messages to other devices on the channel, switching channels and restarting the key generation process.

Additional advantages will be become clear through consideration of the following detailed description.

BRIEF DESCRIPTION OF THE DRAWINGS

The drawings described herein constitute part of this specification and includes example embodiments of the present invention which may be embodied in various forms. It is to be understood that in some instances, various aspects of the invention may be shown exaggerated or enlarged to facilitate an understanding of the invention. Therefore, drawings may not be to scale.

FIG. 6 schematically illustrates an overview of a QKD protocol transmitting trits.

FIG. 7 illustrates an arrangement for multiwavelength encoding and transmitting according to an embodiment.

FIG. 8 illustrates the impact of one-flip quantum errors on the encoding scheme illustrated in FIG. 7.

FIG. 9 shows the value of a received quitrits being affected by one-flip errors.

FIG. 10 shows various probabilities of retrieving $x_i$*for different values of $x_i$ when the BER of the quantum channel is BER=$\alpha$.

DETAILED DESCRIPTION

The described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrase "in one embodiment," "in an embodiment," and similar language throughout this specification may, but do not necessarily, all refer to the same embodiment. References to "users" refer generally to individuals accessing a particular computing device or resource, to an external computing device accessing a particular computing device or resource, or to various processes executing in any combination of hardware, software, or firmware that access a particular computing device or resource. Similarly, references to a server refer generally to a computing device acting as a server, or processes executing in any combination of hardware, software, or firmware that access control access to a particular computing device or resource.

Figure 1:
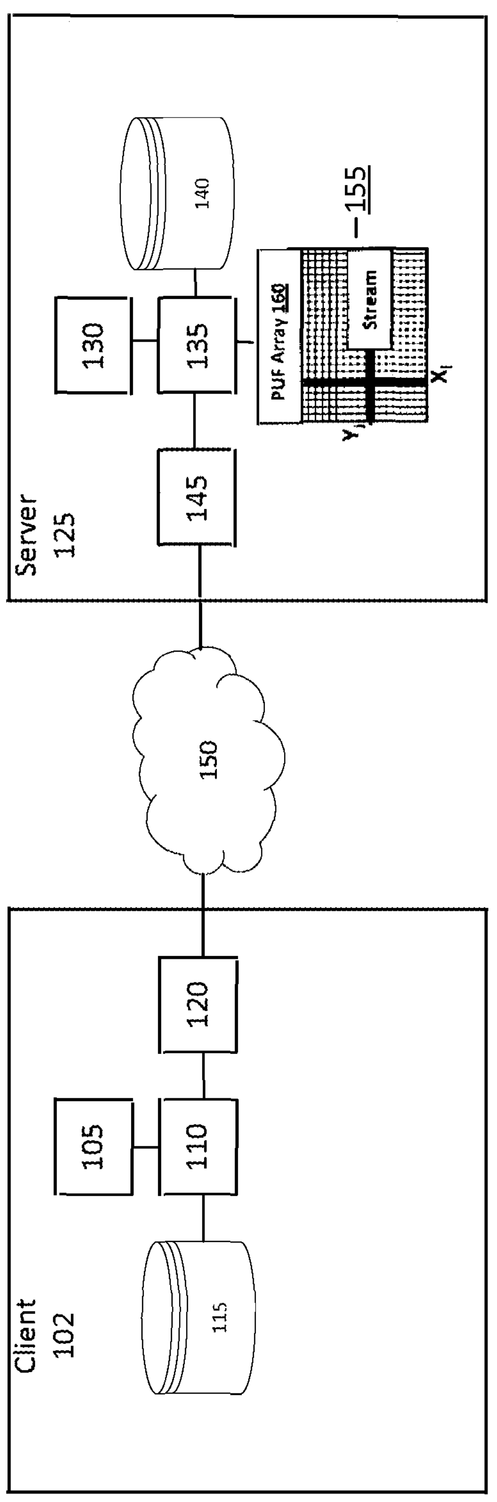
FIG. 1 depicts an exemplary computing environment in which the methods of the present invention may be practiced.

Embodiments of the invention are directed to systems and methods for exchange or independent generation of encryption keys over quantum channels, such as optical channels, using quantum encoded data. Referring now to FIG. 1, there is shown a computing environment usable in connection with the methods described below. The system of FIG. 1 includes a sending computing device, Alice, or server 125 and a receiving computing device, client, or Bob 102, which may be part of a plurality of client devices configured as client 102. Server and client may be computing devices having programmable processors (110, 135). These processors may be quantum or non-quantum processors. They may be native binary or native non-binary (e.g., ternary) processors. Server and client may also have one or more input/output devices 105, 130 that are typically found with computing devices such as keyboards, mice, touch screens, stylus pads, cameras, microphones, speakers and monitors or other visual displays. Server and client may also have volatile memory (e.g., RAM), in electronic communication with their respective processors. Server and client may also have non-volatile storage 115, 140 (e.g., SSD drives, disk drives, flash storage, etc.) in electronic communication with their respective processors. Non-volatile storage may store computer code embodying computer executable instructions capable of being executed by the processors 110, 135 to carry out the various method steps discussed herein, including the method steps described below in connection with FIGS. 2-5. Server and client also may include communication interfaces 120, 145, which are data transceivers supporting communications via network 150 with other computing devices such as one another. Network 150 may be a wired or wireless data communication network and interfaces 120, 145 may be wired or wireless interfaces, or may include both wired and wireless interface components. Preferably, network 150 includes one or more quantum channels, that is, data communications pathways supporting quantum communication such as optical communication. In certain cases, network 150 includes fiber optic communication channels such as low loss optical fibers. In other cases, network 150 includes free space optical communication using lasers and beam steering and conditioning optics. Communication interfaces 120, 145 preferably are quantum interfaces capable of translating electrical data signals (e.g., binary signals of electrically encoded 1s and 0s) into quantum signals (e.g., qubits or single photon pulses encoded with quantum information in the photon's polarization state), and vice versa. Thus, communication interfaces may include laser sources, conditioning optics, shutters, modulators, controllable and switchable polarization retarders, polarization filters, etc., capable of optical quantum data transmission and receipt. In the two-wavelength methods discussed below, the communication methods may include two or more laser or other light sources emitting light of more than one wavelength (e.g., a first source emitting at 1350 nm and a second source emitting at 1550 nm). In these methods, both sources will be typically coupled to a single physical transmission medium (e.g., a fiber or free space) through coupling optics such as gratings or dichroic beamsplitters.

Computing devices 125 and 102 may also include random number generators, or pseudo-random number generators, as ASICs or preferably as processes running on device processors.

In the example of FIG. 1, server device 125 includes an addressable PUF generator (APG) 155, which itself includes an addressable array of physical unclonable function devices 160. The PUF array 160 of a server 125 is an array of electronic or other devices with measurable physical characteristics, configured in an addressable array similar to an addressable memory device such as RAM or ROM chip. Due to small variations which occur during semiconductor manufacturing or other manufacturing processes, each PUF device (and hence each PUF array 160) may be unique, even if the PUF arrays are mass-produced by a process designed to produce nominally identical devices.

Non-limiting examples of measurable physical characteristics of devices used in PUF arrays usable with the invention include time delays of transistor-based ring oscillators and transistor threshold voltages. Additional examples include data stored in SRAM or information derived from such data. For instance, in a PUF array based on SRAM cells, an example of such physical characteristics may be the effective stored data values of individual SRAM devices (i.e., '0' or '1') after being subjected to a power-off/power-on cycle. Because the initial state (or other characteristics) of an individual PUF device may not be perfectly deterministic, statistics produced by repeated measurements of a device may be used instead of single measurements. In the example of an SRAM-based PUF device, the device could be power-cycled 100 times and the frequency of the '0' or '1' state could be used as a characteristic of that device. Other examples of devices or objects usable as PUFs include microelectronic devices and circuits, arbiter, ring oscillators, ReRAM, MRAM, DRAM, FeRAM, and images of objects, including biological objects. Other non-limiting examples of suitable characteristics include optical measurements. For instance, a PUF device may be an optical PUF device which, when illuminated by a light source such as a laser, produces a unique image. This image may be digitized, and the pixels may be used as an addressable PUF array. A good PUF should be predictable, and subsequent responses to the same processing instruction should be similar to each other (and preferably identical).

Additional non-limiting examples of measurable physical characteristics of devices used in PUF arrays are currents induced by an applied input voltage or current, voltages of various circuit elements during operation of a PUF device in response to an input or other stimulus. Further non-limiting examples may include derived quantities such as resistance, conductance, capacitance, inductance, and so on. In certain embodiments, such characteristics of a device may be functions of an input or stimulus level of the device. For example, a current-voltage characteristics of memristors and other devices may be non-linear. Thus, the measured resistance of a memristor will depend on a current or voltage level applied during the measurement process. If a memristor or device with similar characteristics is operated within a non-hysteretic regime, the measured resistance may be a predictable function of the input stimulus (e.g., an input current supplied by a current source). Thus, the relationship between applied current and voltage measured across a memristor (or between applied voltage and current measured through the memristor) is one example of a non-linear transfer function which can be exploited to produce multiple discrete or continuous characteristic values using a single PUF device.

The PUF array 160 (shown as an addressable 2D-array of cells) of a server 125 may be accessed by the server 125 which can receive or generate challenges. The challenges can represent, or be parsed or processed to represent, measurement instructions that can be applied as stimulus to the PUF array to elicit responses, that is to say, the APG 155 responds to challenges by generating responses using measured physical characteristics of one or more PUF devices within the PUF array 160 identified by the challenge or derived from it using instructions stored by the APG 155. As an example, challenges may be a bitstream that is read to identify one or more individual addresses of PUF devices within PUF array 160, and optionally, measurement conditions for those devices. Preferably, APG 155 contains additional processing circuitry and can execute instructions for generating challenges and reading the PUF responses.

Figure 2:
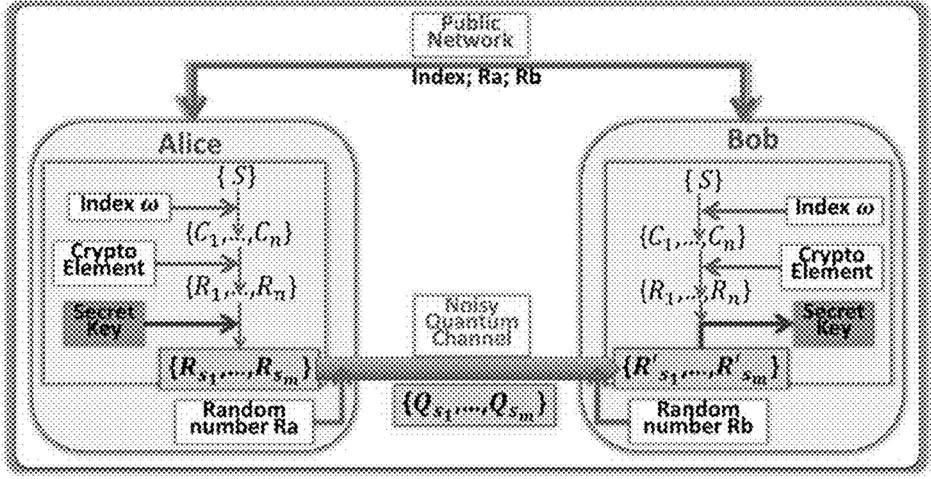
FIG. 2 depicts an overview of the QKD protocol operating in a noisy quantum channel according to one embodiment.
Figure 3:
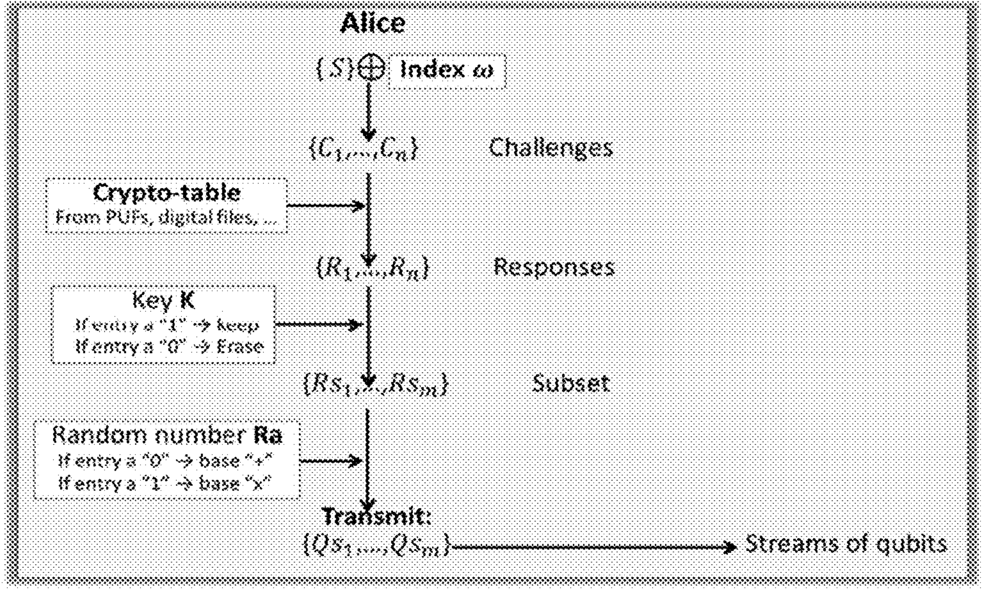
FIG. 3 illustrates the noise insensitivity of the described embodiments.
Figure 4:
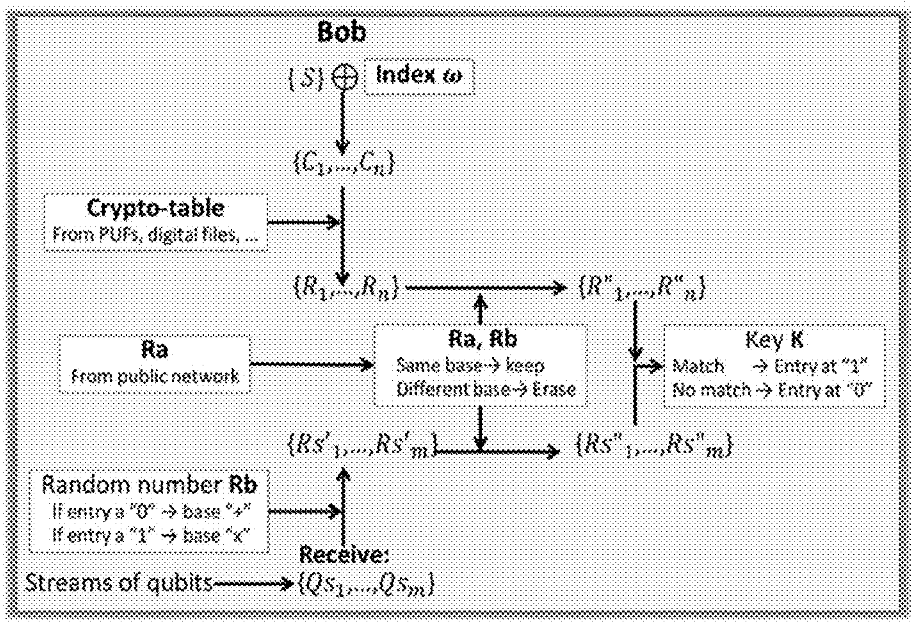
FIG. 4 depicts a protocol to retrieve a secret key through a noisy quantum channel according to one embodiment.

In the arrangement of FIG. 1, a PUF 160 and APG 155 are shown at server device 125, but this is not a requirement of the methods that will be discussed below. The methods that will be discussed in connection with FIGS. 2-5 generally involve two computing devices, a sender (Alice) and a receiver (Bob), each having access to their own cryptographic table. See FIGS. 2-4. As discussed above, a cryptographic table should be understood as any repeatable CRP generation mechanism, that is, any mechanism capable of repeatably returning a given output for a given input. In the simplest case, both Alice and Bob's cryptographic tables may be addressable lookup tables that store random values at addressable locations in memory. In preferred embodiments, however, one of the cryptographic tables depicted in FIGS. 2-4 is provided by a PUF and APG as shown in FIG. 1. In these cases, the other cryptographic table (Bob's) is provided by an image of PUF possessed by Alice. The image is a table of previously measured responses to all possible challenges that may be used in during execution of the methods described below. For example, in the case of an SRAM power-on PUF, the image would be a data table recording the binary state of all SRAM addresses after power on (typically as a result of repeated measurements, and preferably with additional information to mask or ignore unstable cells). Thus, the image ideally enables the possessor of the image to challenge the same responses to the challenges at the PUF.

In the arrangement depicted in FIG. 1, the client device 102 may have an image of the server 125's PUF stored in non-volatile storage. Alternatively, the arrangement can be reversed, and the server device can possess the image, and the client device can possess the PUF and the APG. Indeed, this arrangement is generally preferable because the client device may be in an untrusted environment, and it may be risky for the client device to store a data table of PUF responses as an image. If the sender (Alice, or the server in FIG. 1) is maintained in a trusted environment, it may maintain the PUF image as a cryptographic table with lower overall risk.

A QKD protocol is applicable with minor customization to any quantum channel operating from the transmitting party, Alice, to the receiving party, Bob (i.e., two communicating computing devices as shown in FIG. 1). A version customized for BB84 is presented below and summarized in FIG. 2, however, the methods presented are usable with any QKD protocol. Both Alice and Bob are independently using the same CRP mechanism, sharing the same index and cryptographic table, which could be a Physical Unclonable Function (PUF and its image, or a table generated digitally). They independently generate the same set of n responses {R1, . . . , Rn}, each P-bit long. A typical configuration has n=256, and P=256. Bob uses a randomly generated secret key K to extract, from the full set of responses, a subset of responses consisting of m streams {Rs1, . . . , Rsm}, each P-bit long. A typical configuration has m=~n/2. The responses are filtered, only kept when the entry of K is a digital 1. Alice transmits through the QKD channel the m×P stream of bits of the subset of responses {Rs1, . . . , Rsm} by converting it into a stream of m×P single photons {Qs1, . . . , Qsm}. The photons are polarized with the base + or base x as a function of the entry of the random number Ra. Bob is converting the photons into m streams {Rs'1, . . . , R'sm}, each P-bit long by using a polarizer oriented with the base + or base x as a function of the entry of the random number Rb. During the matching operation, Bob only uses the bits of the m streams {Rs'1, . . . , R'sm} that were transmitted with matching bases. They are thereby transformed into m streams {Rs1, . . . , Rsm}, that are on average P/2 bit long. The secret key K is extracted by comparing the stream {Rs1, . . . , Rsm} with the full stream of responses, as detailed below. This protocol tolerates heavy noise and high rates of bad bits in the stream, as detailed below, which allows QKD over long distances.

Transmission of the Stream of Qubits for Secret Key Distribution

The following algorithm to transmit the secret key through a quantum channel is shown as an example, also summarized in FIG. 3. Steps 8 and 9 use quantum processing.

Alice transmits a secret key through the quantum channel:

1: Variables: Index {ω}, stream {S}, {Crypto-Table}
2: Challenges C: {C1, . . . , Cn}←XOF(concatenate (S, ω)) (for example, with SHAKE)
3: n responses R: {R1, . . . , Rn}, each P-bit long←Challenges C and {Crypto-Table}
4: Key K with m states of 1: {k1, . . . , kn}←random number generator
5: Filter subset of m responses Rs: {R1, . . . , Rm} located at positions of K with a 1
6: Ra←random number generator
7: If the state of Ra is a 0, the base of the transmitting polarizer is +; otherwise, the base is x.
8: m×P qubits Qs: {Qs1, . . . , Qsm}←m×P bits Rs: {Rs1, . . . , Rsm}
   If the state of a bit of the stream Rs is a 0, then the transmitted photon is aligned at 0° with base + and at 45° with a base x.
   If the state of a bit of the stream of Rs is a 1, then the transmitted photon is aligned at 90° with base + and at 135° with a base x.
9: Transmit through the quantum channel Qs: {Qs1, . . . , Qsm}, consisting of m×P qubits.

The method set forth will now be more generally described. Inventive methods require both Alice and Bob to generate the same challenges, so that they both apply the same challenges to CRP mechanisms that are equivalent or mirrors of each other, so that both parties can independently generate the same responses. Additionally, the challenges should be random. But there are no other limitations as to mechanisms usable to generate challenges for Alice and Bob, meaning any number of methods may be used to generate the challenges so long as Alice and Bob end up with the same challenges. By way of example, an index or mutually agreed factors may be used by both communicating parties as part of the challenge generation. Challenge generation may use cryptographic algorithms, pseudo or true random number generators, addressable ternary public key generation (TAPKI), and binary or ternary computations. Challenge generation may incorporate a multifactor authentication scheme such as with passwords, pin code, authentication code, PUFs, position, time, and local conditions.

In the example of the Figures, Alice starts with a random number ω, a stream of values denoted by S, and a cryptographic table. Here, ω may be a random number generated by RNG. S may be a binary bitstream also generated by RNG. Alternatively, one or both of these numbers may be predetermined and/or known to an individual using the Alice machine. For example, S may be a password known to both users. ω and S are used as seeds to generate a set of challenges that will be applied to the cryptographic table. In one example, ω and S are used to generate a bitstream which is parsed into a series of addresses in the cryptographic table. These are challenges, which will be applied to the cryptographic table to elicit responses. In one example, where Alice's cryptographic table is a PUF and APG as in FIG. 1, the challenge bitstream may identify a series of addresses of PUF devices to measure for physical characteristics, and the measurements are the responses. Where the cryptographic table is a PUF image, the challenge bitstream may be read or parsed to identify addresses in the image (i.e., the addresses of previously measured devices in the PUF that were used to create the image). Addresses of known unstable devices may be ignored and excluded from the challenge bitstream to reduce errors.

One way the challenge bitstream may be generated is by concatenating w and S and feeding the result into an extendable-output function, such as SHAKE (or SHA-1, SHA-2, SHA-3, Shake, or a lighter custom hash function), to derive a bitstream which is parsed into n challenges. Using the challenges and the cryptographic table, n responses are generated. If the cryptographic table is an actual data table, such as PUF image, applying the challenges to the table to retrieve responses may require only reading values stored at the addresses identified by the challenges. If the cryptographic table is a PUF, the APG measures a physical characteristic of individual devices identified by the addresses in the challenge bitstream to obtain the bitstream of n responses.

A cryptographic key k, with m states of 1, is created using a random number generator. This key, k, consists of n bits of 0s and 1s, of which m are set to 1. Step 5 involves filtering a subset of m responses Rs: {Rs1, . . . , Rsm}, which are located at the positions in k that have a value of 1. This means that out of n responses, only those with the same index as a 1 in key k are selected. Thus, a stream of m responses is generated, where each response has a position in the original sequence of n responses corresponding to the position of a 1 in k.

Alice can then transmit the subset of m responses to Bob. Bob can then use the subset of m responses received from Alice to reconstruct k. To do this, Bob should have access to information necessary to generate the same challenge bitstream as Alice. This means that Bob should have access to ω, S or Alice's challenge bitstream. Bob may gain access to the required information in a number of ways. For example, S may be a known, shared piece of information, such as a shared password. In this case Bob will have prior knowledge of S. If Alice and Bob are using a synchronized RNG (using a synchronized clock, for example), Bob may be able to independently generate ω and/or S, preferably after some handshake communication to ensure that the RNGs are synchronized. Alice may also transmit ω, which is referred to as the index in FIG. 1. This may be done over a public channel, since in preferred configurations, ω is insufficient to generate the challenges, much less the responses, which requires possession of one of the cryptographic tables (e.g., the PUF or its image).

Thus, with S and ω, Bob may generate the same n challenges that Alice generated. Bob then applies those challenges to its cryptographic table to generate a bitstream of m responses. Bob can then compare the subset of n responses received from Alice to Bob's own complete set of m responses to reconstruct the key k. Those responses in Bob's complete response stream for which there is no matching response in Alice's stream correspond to 0 in k, and those responses in Bob's complete response stream for which there is a matching response in Alice's response stream correspond to a 1 in k.

It is important to note that the key reconciliation procedure just described is completely agnostic as to the transmission channel. Alice could transmit her response subset stream and the index ω over any sort of channel (e.g., conventional electronic or RF channels), using any encoding scheme appropriate to that medium. However, as will be described now, this procedure can be enhanced by having Alice transmit at least the subset of responses over a QKD channel. This enhances the security of the transmission of the responses (by leveraging QKD's inherent resistance to eavesdropping), but the scheme is also remarkably insensitive to noise or errors introduced in the QKD channel, as will be shown below.

The following describes how the method just described may be used in conjunction with QKD, again using BB84 as one example of a QKD protocol, but many other QKD protocols are also usable such as Decoy, Eker, EPR, MDI, or Phase Matching. Alice generates another stream of random numbers (Ra) to define the base for transmitting the subset of responses over the quantum key distribution (QKD) channel. Ra is shared with Bob, which may occur over a public channel. If the state of the random bit is 0, the base of the transmitting polarizer is +; otherwise, the base is x. The m×P bits Rs={Rs1, . . . , Rsm} are transferred as m×P qubits Qs={Qs1, . . . , Qsm} over the QKD Channel. If the state of a bit in the stream Rs is 0, the transmitted photon is aligned at 0° with base + and at 45° with a base x. Conversely, if the state of a bit in the stream Rs is 1, the transmitted photon is aligned at 90° with base + and at 135° with a base x.

Reception of the Stream of Qubits and Recovery of the Secret Key

The following algorithm to recover the secret key from a quantum channel is shown as an example, also summarized in FIG. 4. Steps 7 and 8 use quantum processing.

Bob retrieves the secret key from the quantum channel:

1: Variables: Index {ω}, stream {S}, {Crypto-Table}, Ra
2: Challenges C: {C1, . . . , Cn}←XOF (concatenate (S, ω)) (for example, with SHAKE)
3: n responses R: {R1, . . . , Rn}, each P-bit long←Challenges C, and {Crypto-Table}
4: Rb←random number generator
5: If the state of Rb is a 0, the base of the receiving polarizer is +; else the base is x
6: m×P bits Rs': {Rs'1, . . . , Rs'm}←m×P qubits Qs: {Qs1, . . . , Qsm}
   If the base is +:
      When the photon is aligned at 0° the bit received is 0
      When the photon is aligned at 90° the bit received is 1
   If the base is x:
      When the photon is aligned at 45° the bit received is 0
      When the photon is aligned at 135° the bit received is 1
7: m×Rs: {Rs1, . . . , Rsm}<m×P bits R's: {R's1, . . . , Rsm}
   Only the positions with a match between Ra and Rb are kept
   Each block Rsi is pi-bit long with i∈{1, m} and pi~P/2
8: Retrieve Key K←R: {R1, . . . , Rn} and Rs: {Rs1, . . . , Rsm}
   During the retrieving operation, each block of R is filtered with Ra and Rb to use the same positions of the block of Rs that it is compared to:
      pi-bit long Rsi is compared to responses of R that are also pi-bit long
   ki of K: {k1, . . . , kn} is:
      a 1 when the match is equal or greater than the threshold
      a 0 when the match is lower than the threshold Bob generates the same challenge-response pairs using the same variables as Alice. He uses random number generators to create his own bases (Rb). There is no requirement that Bob share Rb with Alice. If the state of Rb is 0, the base of the receiving polarizer is +; otherwise, the base is x. The bit received depends on the alignment of the photon and the base as follows: If the base is set to +, and if the photon is aligned at 0°, the received bit is 0; whereas, if the photon is aligned at 90°, the received bit is 1. Conversely, if the base is set to x, then different rules apply: the alignment of the photon at 45° leads to a received bit of 0, and the alignment at 135° results in a received bit of 1. Bob has received Ra from Alice, and so can determine the qubits in the received stream for which Ra=Rb. Only the positions in the qubit stream with a match between Ra and Rb are kept. Each block should be about half the size of p.

At this point, Bob has received a stream of m responses from Alice. These responses were originally p bits long, but Bob ignores all qubits at positions in Ra and Rb that do not match. This results in about half the bits being dropped from received responses, which are now pi bits long. In the notation above and in the figures, this quantum filtered set of responses is denoted Rs1, . . . Rsm. Importantly, however, Bob knows the positions in each filtered response of the dropped bits (from Ra and Rb), and he knows that the originally sent responses were P bits long (the same length as Bob's own responses in R1 . . . n. This allows Bob to match the received responses Rs1, . . . Rsm, to responses in the full response set R1, . . . Rn. Bob takes a first response, R1, which is length p. He then applies filtering based on Ra and Rb, that is, he takes the first p bits of Ra and Rb. That was the portion of the Ra/Rb filter that was applied to generate Rs1. For positions within those first p bits for which Ra does not match Rb, he masks or excludes bits from R1. This results in R1, which will have a length of pi or about p/2. Bob then compares R1 to Rs1 to determine whether they match. This may be done by computing a Hamming distance, computing a BER, etc., and then applying some threshold to determine a match. If there is a match, then the response R1 corresponds to the position of a 1 in the key K. If they do not match, then the received response Rs1 must be checked against the next response R2, and this is repeated until a match is found. Generally, this will not take very many iterations because Rs1's match is likely to occur close to the beginning of R. This process is repeated for all of the received responses Rs1, . . . , Rsn using the Ra/Rb filter that was used for the received response. For every match between a received response and a response in R, a 1 (or more generally a first binary symbol) is put in the position of the matched response in R. For responses in R for which there are no matches, a 0 (or more generally, a second binary symbol) is put in in the position of the unmatched response. In this manner, the secret key K is reconstructed.

This process will now be described with an example.

As is described above, Bob has a full response set R, with n responses, each of length p, for a total bit length of n x p. Bob receives Rs'1, . . . , Rs'm. These are a subset of responses sent by Alice that correspond to the positions of 1s (or a first binary symbol) in the key. There are m of these responses, each of which is p bits long. These responses have been subject to Bob's quantum filtering bases (i.e., the + and X polarizer orientations set by Rb for each received qubit). Bob builds a filter out of Rb (which he generated-a number of length m x p) and Ra, which he receives from Alice. Each of Ra and Rb is m X p long, and it may be divided into n chunks (f1, . . . fn), each of which is applied to a corresponding received response. Applying these filter portions to the received responses Rs'1, . . . , Rs'm results in bits being dropped from that stream at positions where Ra and Rb are different. This results in another, shorter stream of responses Rs1, . . . Rsm, that is, m responses of length pi, where pi=~p/2. This process is illustrated with a simplified example below:

Suppose P=8

Suppose the first P bits of Ra=1 0 0 1 0 0 1 1

Suppose the first P bits of Rb=1 1 0 0 1 1 1 1

So, the first portion of the Ra/Rb filter (f1) is given by 1 0 1 0 0 0 1 1 (where 1 denotes matching positions, and 0 denotes unmatched positions)

Suppose Rs'1=1 1 0 1 0 0 1 0. Applying the Ra/Rb filter (f1) results in Rs1=1X0XXX10, which is 1010.

But now, Bob must find the position in R that corresponds to Rs1. Rs1 is half the bit length of every response in R (R1, . . . Rn), so Bob must filter every response in R with f1 before matching.

Suppose R1 (the first response that Bob generated, e.g., with his PUF) is 1 1 1 1 0 0 0 0. Bob applies the first Ra/Rb filter portion (1 0 1 0 0 0 1 1) to R1, yielding 1 X 1 X X X 0 0 or 1100. This is R1 in FIG. 3. Bob then compares 1010 (Rs1) to 1100 (R1) and determines whether they match to within some threshold (i.e., by requiring a Hamming distance below some threshold, or a BER below some threshold). Here, there is no match, so the process is repeated on the next response in the full response set R2. R2 is filtered with f1, and the result is compared with Rs1. This continues until there is a match. Where there is a match, the method identifies the position in R of a 1 (or the first binary symbol) in the key. The process is then repeated with the rest of the received responses Rs2, . . . Rsm, and their respective portions of the Ra/Rb filter (f2, . . . fm) until all the matches in R are identified (i.e., the positions of all the 1s in k). For all responses in R for which no matches are found, these are the positions of 0s (or the second binary symbol) in k.

Suppose Rs'1=1011. Because Bob knows the length of the originally transmitted response, and he knows what portion of the Ra/Rb filter was applied to Rs'1, he knows that the originally transmitted response would have been 1 X 0 X X X 1 1, where the Xs are unknown bits.

More generally, in the process of retrieving data, each segment of R undergoes a filtering process with Ra and Rb, enabling it to match specific positions within the Rs block to which it is being compared. This involves aligning p-bit length sections of Rsi with corresponding p-bit long parts of R. The resulting value of ki in the set K={k1, . . . , kn} depends on the level of match. If the match meets or surpasses the designated threshold, ki is assigned a value of 1; if the match is under the threshold, ki is assigned a value of 0.

Ability to Manage Noisy Quantum Channels

Figure 5:
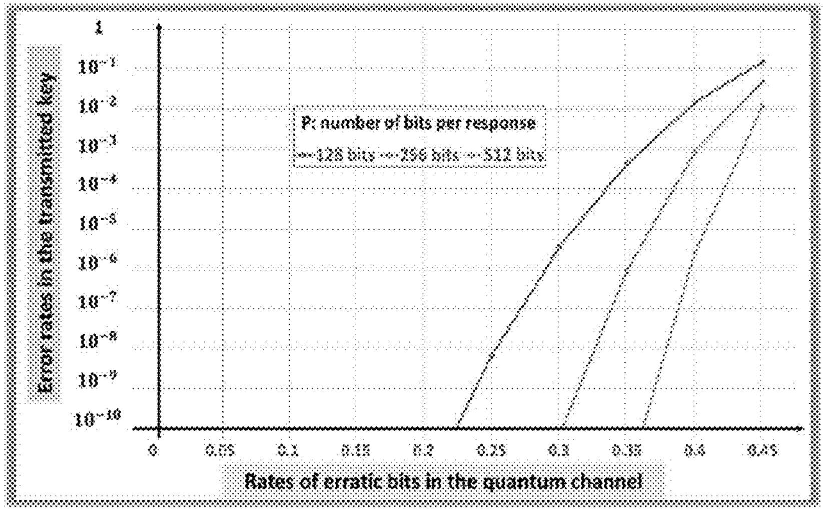
FIG. 5 depicts error rates in keys transmitted through a noisy quantum channel.

The QKD architecture presented above in the previous sections describes an example of embodiment of the novel scheme. The core of the invention is to transmit a subset of responses through the quantum channel, which has the interesting property to be able to handle high levels of noise, and bad bits. The relationship between noise in the quantum channel, and error rate in the transmission of the keys is shown in FIG. 5.

When the number of bits of each response is P=256, very low levels of errors are detectable with noises in the quantum channel as high as 30%. Small error correcting schemes can be added to manage as much as 40% noise. If needed, the selection of P=512 allows the transmission of cryptographic keys with 45% noise, which greatly enhances the transmission over longer distances. This 40 to 45% error correction is obtained without adding any additional helper data to the signal path.

This protocol incorporates an error detection and error correction approach that enables the receiver to determine the correct key by iteratively analyzing the responses, identifying matches, and addressing collisions and failures to detect. By the conclusion of the search process, the receiver will possess the necessary information to determine the positions that correspond to successful matches and those requiring further investigation by flipping one bit at a time.

Detecting Eavesdropping

An extension of the basic QKD methods described above will now be described, which is usable to detect eavesdropping on the quantum transmission channel.

Without an eavesdropper on a quantum channel intercepting photon, the BER for photons transmitted with matching bases will equal the quantum noise on the channel. With an eavesdropper on the channel, the BER will be higher. Thus, for photons transmitted and received with matching polarization bases, without eavesdropping and without quantum noise, one would expect a BER of 0%. Without eavesdropping and with quantum noise at a rate of $\alpha$, one would expect a BER of $\alpha$.

Eavesdropping on a QKD channel operating under BB84, the eavesdropper can be expected to introduce a BER of 25%, thus on a channel with an eavesdropper, but without quantum noise, one would expect a BER of 25%. With an eavesdropper and with quantum noise at a rate of $\alpha$, the BER will depend on whether photons are being sent with or without matching bases. With an eavesdropper, with quantum noise $\alpha$, and with non-matching positions of the bases, one would expect a BER of 50%, but for matching bases, one would expect a BER of $\alpha$. Thus, on average, with an eavesdropper, the expected BER is given by $(\alpha+0.5)/2$.

Assuming that the quantum noise with BER=a follows a normal distribution (in time) with a standard deviation of $\sigma$, the measurement of the BER on matching bases with a BB84 protocol can detect eavesdropping with a probability greater than 99.9% when $(\alpha+3\sigma)>0.5$. For example, if $\alpha=0.35$ and $\sigma=0.04$, the probability of not detecting eavesdropping is less than 10e-4.

As is discussed at length above, a method for recovering an N-bit long ephemeral key may be based on the processing of a subset of approximately N/2 P-bit long responses. The processing in this case is a process of matching a received response (generated by one device's CRP mechanism) to a locally generated response from a mirrored CRP mechanism. Without any error (i.e., BER=0), each response of the subset is matched with a response that has the same information for the positions with matching QKD bases through BB84. The rate of bad bits is a measurement of the BER. More specifically, a rate of bad bits for matching responses (e.g., responses with a low relative Hamming distance) is a measurement of BER, that is, the rate of unmatching bits that occur in response streams for which there is a high confidence of match. In an inventive method, this rate is measured. This measurement is compared with a, the nominal BER of the quantum channel. When the difference between the measured BER (the rate of bad bits in matching responses) and a is greater than 3σ, the standard deviation, eavesdropping has been detected. Such a method works generally so long as $\alpha+3\sigma$ is lower than 50%.

The nominal BER of the channel can be measured by injecting streams of bits and observing the error rates or computed with predictive methods. For example, streams of known bits (e.g., the seeds for challenge generation in the methods above) may be repeatedly transmitted or re-transmitted over some long time base that an eavesdropper is unlikely to be on the channel, and the BER characteristic of the channel can be measured. Additionally or alternatively, the BER of the channel can be predicted from known information about the channel. For example, the maximum acceptable distance to transmit KQD is known experimentally and based on theoretical computations. Additionally, the nominal BER will typically be a normal (gaussian) probability centered at an average BER position, given that nominal BER will vary somewhat over time and with various conditions. For example, in the case of a free space transmission (e.g., a ground to satellite transmission) weather conditions and interacting objects can vary over time, which impacts BERs. The BERs could follow a normal distribution, or when a specific weather condition is observed, a distribution can follow predictive models.

An important advantage to this method of detecting eavesdropping is that the communicating parties do not need to exchange part of the information related to the matching positions to detect an attack.

Implementation with QKD Having Two Wavelengths

Figure 6:
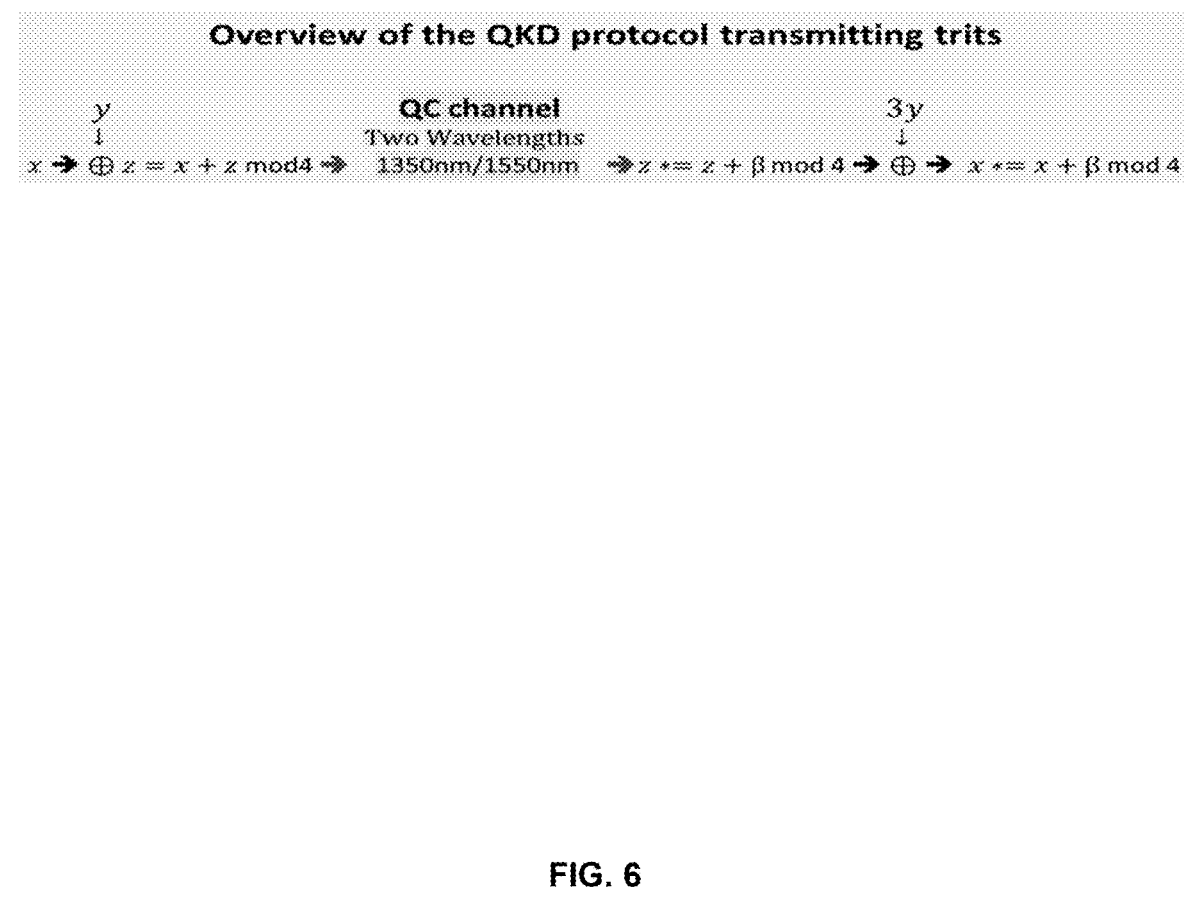

An example implementation of the protocol just discussed will now be discussed in the context of QKD having two wavelengths. A usable basic method is described in co-assigned U.S. patent application Ser. No. 16/951,760, entitled Secure multi-state quantum key distribution with wavelength division multiplexing, filed on Nov. 18, 2020, published on May 20, 2021, which is incorporated by reference in its entirety. According to a method, a first device transmits over quantum channel k quatrits by using two types of photons having different wavelengths. The objective is to transmit, with a protocol similar to BB84, a stream of k trits x: $\{x_1, \ldots, x_i, \ldots, x_k\}$ with $x_i \in \{0, 1, 2\}$ that is added modulo 4 with a stream of k shared quatrits y: $\{y_1, \ldots, y_i, \ldots, y_k\}$ with $y_i \in \{0, 1, 2, 3\}$ to form the stream of k quatrits z: $\{z_1, \ldots, z_i, \ldots, z_k\}$ with $z_i = x_i + y_i \bmod 4$. Without quantum errors, the stream of k trits is recovered after adding $3y_i$ modulo 4 to $z_i$. When a stream of k quantum errors β: $\{\beta_1, \ldots, \beta_i, \ldots, \beta_k\}$ with $\beta_i \in \{0, 1, 2, 3\}$, is added to z during transmission in the quantum channel, the stream of quatrits recovered is x*: $\{x_{*1}, \ldots, x_{*i}, \ldots, x_{*k}\}$ with $x_{*i} = x_i + \beta_i \bmod 4$. This method is schematically illustrated in FIG. 6.

As done with BB84, two bases are driving the polarization of the photons during transmission through the quantum channel. As shown in FIG. 7 the two wavelengths allow the handling of four states, rather than two for the BB84.

A quantum error is visible when a photon flips from 0° to 90°, or 90° to 0° for base +, and from 45° to 135°, or 135° to 45° for base X, as shown in FIG. 8. For both bases, a state of 1 is received instead of 0, or inversely 0 instead of a 1, and a state of 3 is received instead of 2, or inversely a 2 instead of a 3.

As shown in FIG. 9, the flip of a 0 to a 1 represents an error $\beta_i = 1$, which represents the same error than a flip from 2 to 3. Conversely the flip of a 1 to a 0 represents an error $\beta_i = -1$, which represents the same error than a flip from 3 to 2.

Protocol to Transmit One Trit Using Two QKD Wavelengths. The following protocol describe the transmission of each trit $x_i$ with $i \in \{0, k\}$ through a noisy quantum channel. Each photon transmitted with a base + or X has a probability a to flip to the opposite orientation: With +|0>→|1> or |0>→|1>; with X|+>→|−> or |−>→|+>. The probability to recover a quatrit with a state of 3 is α/3 as shown below:

Input trit $x_i$: $x_i \in \{0, 1, 2\}$

Shared nonce—quatrit $y_i$: $y_i \in \{0, 1, 2, 3\}$

Transmitted through QC: $z_i = x_i + y_i \bmod 4$

Received from QC: $z_i^* = z + \beta_i \bmod 4$

If transmission is error free: $\beta_i = 0$

Else, with one flip:

If the value of z is 0 or 2: $\beta_i = 1$

If the value of z is 1 or 3: $\beta_i = -1$

Output quatrit $x_i^*$: $x_i^* = z_i^* + 3y_i \bmod 4$ $$\text{Output quatrit } x_i^* : x_i^* = zi^* + 3y_i \bmod 4$$
$$= x_i + y_i + \beta_i + 3y_i \bmod 4$$
$$= x_i + \beta_i \bmod 4$$

If transmission error free: $x_i^* = x_i$

Else, with one flip:

If the value of zi is 0 or 2: $x_i^* = x_i + 1 \bmod 4$

If the value of zi is 1 or 3: $x_i^* = x_i - 1 \bmod 4$

The erratic $x_i^*$ is computed in the left sided table shown in FIG. 10.

The probability of retrieving $x_i^*$ for various value of $x_i$ is computed in the right sided table shown in FIG. 10 when the BER of the quantum channel is BER=α; the probability to observe the third state is $P_3 = \alpha/3$.

EXAMPLES

Case 1: Zero quantum errors and active eavesdropping: Half of the transmitted photons are not disturbed, and half of the transmitted photons sees BER=50%; $P_3 = 0.25/3$ Case 2: BER=a and no active eavesdropping: a of the transmitted photons are flipped; $P_3 = \alpha/3$ Case 3: BER=40% and active eavesdropping: Half of the transmitted photons sees BER=α, and half of the transmitted photons sees BER=50%; $P_3 = 0.45/3$ Case 4: BER=α and active eavesdropping: Half of the transmitted photons sees BER=α, and half of the transmitted photons sees BER=50%; $P_3 = (\alpha + 0.5)/6$ The probability $P_1$ to get a state of 1 is always at 1/3.

Protocol to Detect Eavesdropping

In view of the proofs above, a protocol may be implemented, and is disclosed herein, that permits the sharing of a key over a quantum channel, while also detecting eavesdropping. As set forth above, eavesdropping may be detected by comparing a measurement of a quantum channel's nominal BER a with a current or instantaneous BER, where eavesdropping is detected if the current BER exceeds the nominal BER by a predetermined threshold, such as α+3σ. This basic observation and the methods that it suggests are agnostic as to the nature of the quantum channel or the nature of the encoding scheme, and this basic method is usable with any quantum encoding scheme, either the single-wavelength BB84 scheme described above or the two-wavelength scheme just previously described. However, method of sharing ephemeral keys described in this disclosure permits a convenient way to measure current BER, since it requires comparing a local generated bitstream (i.e., locally generated responses), with responses received over a quantum channel, and so bit-errors from matching responses (where the bit errors are not sufficiently large for a match to not be detected) can be readily measured. An eavesdropping detection protocol using the two-wavelength quantum transmission scheme above is as follows:

The recovery of the N-bit long ephemeral key is based on the processing (i.e., matching) of a subset of approximately N/2 P-bit long responses.

Without any error, i.e., BER=0, each response of the subset is matched with a response that has the same information for the positions with matching QKD bases.

The rate of quatrits with a state of 3 is a measurement of the BER=$\alpha$.

This measurement is compared with $\alpha/3$, the nominal rate of positions showing a state of 3 in the matching positions of the subset of responses.

When the difference between this last measurement and $\alpha/3$ is greater than $\sigma$, the standard deviation, eavesdropping has occurred.

Such a method works as long as $\alpha+3\sigma$ is lower than 50%. It should be noticed that in this protocol, the communicating parties do not need to exchange part of the information related to the matching positions to detect an attack. Counting the rate of state 3 in the positions of the subset of responses having matching rates is enough to detect an attack.

It should be understood that, unless explicitly stated or otherwise required, the features disclosed in embodiments explicitly described herein and elsewhere in this disclosure may be used in any suitable combinations. Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

The invention claimed is:

1. A method to distribute a secret key from a first computing device to a second computing device while detecting eavesdropping on a quantum channel comprising:

at a first computing device, generating a secret key of length n;

generating a first set of challenges;

applying the first set of challenges to a first challenge response pair mechanism (CRP) and receiving a first set of ordered n responses of length p;

selecting from the first set of ordered n responses a subset of m responses that occupy positions in the ordered set also occupied by a first binary value in the secret key;

transmitting the m responses to a second computing device over a quantum data transmission channel;

at the second computing device;

receiving the subset of m responses;

generating the first set of challenges;

applying the first set of challenges to a second CRP to generate second set of ordered n responses;

comparing each response in the received subset of m responses to each response in the second set of ordered n responses to determine the positions in the second set of ordered n responses that match responses in the subset of m responses;

generating a key by assigning the first binary value to positions in the key corresponding to positions in the second set of ordered n responses for which there are matching responses in the subset of m responses and assigning a second binary value to the remaining positions in the key, wherein, comparing each response in the received subset of m responses to each response in the second set of ordered n responses to determine the positions in the second set of ordered n responses that match responses in the subset of m responses comprises performing a bitwise comparison between pairs of responses and determining a match when the bitwise similarity between the responses exceeds a predetermined threshold;

and further comprising, measuring a rate of bit errors (BER) in matching response pairs, and determining that eavesdropping is occurring on the basis of comparing the measured BER to a predetermined threshold.

2. The method of claim 1, wherein the predetermined threshold is based on a nominal bit error rate for the quantum data transmission channel.

3. The method of claim 2, wherein determining that eavesdropping is occurring on the basis of comparing the measured BER to a predetermined threshold comprises that determining eavesdropping is occurring when the measured BER exceeds the nominal bit error rate for the quantum data transmission channel by a predetermined threshold.

4. The method of claim 3, wherein the predetermined threshold is three times a standard deviation of a normal distribution of a nominal bit error rate over time.

5. The method of claim 1, further comprising taking corrective action when eavesdropping is determined.

6. The method of claim 5, wherein the corrective action comprises one of causing communication to cease between the first and second computing devices, transmitting a warning message from one of the first or second computing devices, discarding the secret key or restarting a key generation process.

7. The method of claim 1, wherein, wherein transmitting the m responses to a second computing device over a quantum data transmission channel comprises optically encoding the m responses into photons having one of a first, a second, a third and a fourth states, wherein each state is characterized by one of a first or second wavelengths and a first or second polarization state.

8. The method of claim 7, wherein measuring a rate of bit errors (BER) in matching response pairs, and determining that eavesdropping is occurring on the basis of comparing the measured BER to a predetermined threshold comprises measuring the rate at which photons having one of the first, second, third or fourth state are received.

9. The method of claim 1, wherein the quantum data transmission channel includes an optical transmission channel.

10. The method of claim 9, wherein the optical transmission channel is one of an optical fiber or free space.

11. The method of claim 1, wherein performing a bitwise comparison between pairs of responses and determining a match when the bitwise similarity between the responses exceeds a predetermined threshold comprises determining a match when a Hamming distance between pairs of responses is below a predetermined threshold.

12. The method of claim 1, wherein generating a first set of challenges at a first computing device comprises generating a first set of challenges with a random number.

13. The method of claim 12, further comprising generating a first set of challenges at a first computing device by concatenating the random number with a known number and providing the result to an expanded output function.

14. The method of claim 12, wherein generating the first set of challenges at the second computing device comprises receiving the random number from the first computing device and using the random number to generate the first set of challenges.

15. The method of claim 1, wherein the second CRP mechanism is a PUF array, and the first CRP mechanism is an image of the PUF array.

16. A method of detecting eavesdropping on a quantum communications channel between a first computing device and a second computing device, comprising:

at a second computing device:

receiving a first set of m responses generated by a first challenge-response pair (CRP) mechanism at a first computing device, the set of m responses being quantum encoded and transmitted over the quantum communications channel;

generating a set of challenges to a second CRP mechanism at the second computing device, the second CRP mechanism being a mirror of the first CRP mechanism;

applying the set of challenges to the CRP mechanism at the second computing device, and receiving a second set of n responses;

performing a bitwise comparison between each response in the first set of m responses and each response in the second set of n responses and determining which response pairs match to a predetermined degree;

for matching pairs of responses, determining a bit error rate (BER) on the basis of non-matching bits within matching response pairs; and comparing the determined BER with a nominal BER for the quantum communications channel, and on the basis of the comparison, determining that eavesdropping is occurring on the quantum communications channel;

wherein comparing the determined BER with a nominal BER for the quantum communications channel, and on the basis of the comparison, determining that eavesdropping is occurring on the quantum communications channel comprises determining whether the determined BER exceeds the nominal BER by a predetermined amount.

17. The method of claim 16, wherein the first set of m responses were transmitted in accordance with a QKD protocol.

18. The method of claim 16, wherein the predetermined amount is three times a standard deviation of a normal distribution of the nominal bit error rate over time.

19. The method of claim 16, wherein the second CRP mechanism is a PUF array, and the first CRP mechanism is an image of the PUF array.

* * * * *